(12) United States Patent
Jing

(10) Patent No.: US 11,769,125 B2
(45) Date of Patent: Sep. 26, 2023

(54) METHOD AND APPARATUS FOR PROCESSING TRANSACTION REQUESTS IN BLOCKCHAIN, DEVICE AND MEDIUM

(71) Applicant: Baidu Online Network Technology (Beijing) Co., Ltd., Beijing (CN)

(72) Inventor: Bo Jing, Beijing (CN)

(73) Assignee: Baidu Online Network Technology (Beijing) Co., Ltd, Beijing (CN)

( * ) Notice: Subject to any disclaimer, the term of this patent is extended or adjusted under 35 U.S.C. 154(b) by 154 days.

(21) Appl. No.: 17/211,472

(22) Filed: Mar. 24, 2021

(65) Prior Publication Data
US 2021/0209567 A1  Jul. 8, 2021

(30) Foreign Application Priority Data

May 22, 2020  (CN) .......................... 202010443579.4

(51) Int. Cl.
*G06Q 20/10* (2012.01)
*G06Q 20/38* (2012.01)
(Continued)

(52) U.S. Cl.
CPC .......... *G06Q 20/102* (2013.01); *G06F 17/18* (2013.01); *G06Q 20/382* (2013.01); *H04L 9/50* (2022.05); *H04L 2209/56* (2013.01)

(58) Field of Classification Search
None
See application file for complete search history.

(56) References Cited

U.S. PATENT DOCUMENTS 7,509,370 B1 * 3/2009 Branda ................... G06F 9/466
709/201
10,873,625 B2 * 12/2020 Zeng ................... H04L 41/0893
(Continued)

FOREIGN PATENT DOCUMENTS

CN        107688999 A        2/2018
CN        109166037 A        1/2019
(Continued)

OTHER PUBLICATIONS

Antonopoulos, "Mastering Bitcoin", O'Reilly, 2017. (Year: 2017).*
(Continued)

*Primary Examiner* — Lindsay M Maguire
(74) *Attorney, Agent, or Firm* — Norton Rose Fulbright US LLP; James R. Crawford

(57) ABSTRACT

The present application discloses a method and an apparatus for processing transaction requests in a blockchain, a device and a medium, which relate to blockchain technologies. The method includes: aggregating transaction requests to be selected with dependency relationships in a blockchain network to obtain at least one transaction request set; determining candidate factor intervals to which the transaction request set belongs, where the factor interval is used to evaluate a probability that the transaction request set participates in a block generation process; and selecting a current target factor interval from the candidate factor intervals, and selecting a current target transaction request set participating in the block generation process from candidate transaction request sets corresponding to the current target factor interval.

7 Claims, 7 Drawing Sheets

(51) Int. Cl.
  *G06F 17/18*  (2006.01)
  *H04L 9/00*   (2022.01)

(56) References Cited

U.S. PATENT DOCUMENTS

| | | | | |
|---|---|---|---|---|
| 2017/0212781 | A1* | 7/2017 | Dillenberger | G06F 9/5038 |
| 2018/0109541 | A1* | 4/2018 | Gleichauf | H04W 8/24 |
| 2018/0158034 | A1* | 6/2018 | Hunt | G06Q 20/00 |
| 2018/0374086 | A1* | 12/2018 | Ardashev | H04L 9/3247 |
| 2019/0205773 | A1* | 7/2019 | Ackerman | G06Q 10/067 |
| 2020/0044824 | A1* | 2/2020 | Xie | H04L 9/0637 |
| 2020/0394176 | A1* | 12/2020 | Wu | G06F 16/9024 |
| 2022/0269670 | A1* | 8/2022 | Li | G06F 16/2343 |

FOREIGN PATENT DOCUMENTS

| | | |
|---|---|---|
| CN | 109214795 A | 1/2019 |
| CN | 109472566 A | 3/2019 |
| CN | 109492566 A | 3/2019 |
| CN | 110431579 A | 11/2019 |
| CN | 110619582 A | 12/2019 |
| CN | 110806923 A | 2/2020 |
| EP | 3816906 A2 | 5/2021 |
| WO | 2019072303 A3 | 4/2019 |

OTHER PUBLICATIONS

Andreas M Antonoloulos: "Mastering Bitcoin", Jul. 21, 2017 (Jul. 21, 2017), XP055570487, ISBN: 978-1-4919-5438-6, Retrieved from the Internet: URL: https://www.oreilly.com/library/view/mastering-bitcoin-2nd/9781491954379/.

Office Action and Search Report dated Feb. 22, 2023 by the CIPO in the corresponding Patent Application No. 202010443579.4, with English translation.

* cited by examiner

METHOD AND APPARATUS FOR PROCESSING TRANSACTION REQUESTS IN BLOCKCHAIN, DEVICE AND MEDIUM

CROSS-REFERENCE TO RELATED APPLICATION

This application claims priority to Chinese patent application No. 202010443579.4, filed on May 22, 2020, which is hereby incorporated by reference in its entirety

TECHNICAL FIELD

Embodiments of the present application relate to computer technologies, particularly to blockchain technologies, and more particularly to a method and an apparatus for processing transaction requests in a blockchain, a device and a medium.

BACKGROUND

At present, in a blockchain network with a block output reward mechanism, a block output node usually sorts transactions according to amounts of service fees for a large number of transactions, so as to select transactions to be processed.

SUMMARY

The embodiments of the present application disclose a method and an apparatus for processing transaction requests in a blockchain, a device and a medium, in order to improve a rationality and a selection efficiency of a blockchain node in selecting transaction requests in a block generation process, and improve the block output efficiency.

In a first aspect, an embodiment of the present application discloses a method for processing transaction requests in a blockchain, including:

aggregating transaction requests to be selected with dependency relationships in a blockchain network, to obtain at least one transaction request set;

determining candidate factor intervals to which the transaction request set belongs, wherein the factor interval is used to evaluate a probability that the transaction request set participates in a block generation process; and selecting a current target factor interval from the candidate factor intervals, and selecting a current target transaction request set participating in the block generation process from candidate transaction request sets corresponding to the current target factor interval.

In a second aspect, an embodiment of the present application further discloses an apparatus for processing transaction requests in a blockchain, including:

a transaction request set determination module configured for aggregating transaction requests to be selected with dependency relationships in a blockchain network, to obtain at least one transaction request set;

a candidate factor interval determination module configured for determining candidate factor intervals to which the transaction request set belongs, wherein the factor interval is used to evaluate a probability that the transaction request set participates in a block generation process; and a transaction request set selection module configured for selecting a current target factor interval from the candidate factor intervals, and selecting a current target transaction request set participating in the block generation process from candidate transaction request sets corresponding to the current target factor interval.

In a third aspect, an embodiment of the present application further discloses an electronic device, including:

at least one processor; and a memory communicatively connected to the at least one processor; where, the memory stores instructions executable by the at least one processor to enable the at least one processor to perform the method for processing transaction requests in a blockchain according to any one of the embodiments of the present application.

In a fourth aspect, an embodiment of the present application further discloses a non-transitory computer readable storage medium storing computer instructions for enabling a computer to perform the method for processing transaction requests in a blockchain according to any one of embodiments of the present application.

It should be understood that those described in the summary section are neither intended to identify the key or important features of the embodiments of the present application, nor intended to limit the scope of the present application. Other features of the present application will be readily understood through the following description.

BRIEF DESCRIPTION OF THE DRAWINGS

The accompanying drawings are provided for better understanding of the solutions, rather than limiting the present application. In which.

DETAILED DESCRIPTION OF THE EMBODIMENTS

Exemplary embodiments of the present application are described below with reference to the accompanying drawings, including various details of the embodiments of the present application to facilitate the understanding, and those embodiments should be considered as merely exemplary. Thus, it should be understood by those of ordinary skill in the art that various changes and modifications can be made to the embodiments described here without departing from the scope and spirit of the present application. Also, for the sake of clarity and conciseness, the contents of well-known functions and structures are omitted in the following description.

As described above, at present, in a blockchain network with a block output reward mechanism, a block output node usually sorts transactions according to amounts of service fees for a large number of transactions, so as to select transactions to be processed. However, the number of transactions processed by a block output node is usually limited, so it is very easy to rupture dependency relationships between the transactions when the transactions to be processed are selected according to the service fees, and errors will occur in subsequent transaction processing. Therefore, how to guarantee the reward incomes of the block output nodes while ensuring the smooth execution of each transaction is still an urgent problem to be solved in the field of blockchains. Moreover, as for a block output node, how to improve the block output efficiency is also a nonnegligible problem.

Figure 1:
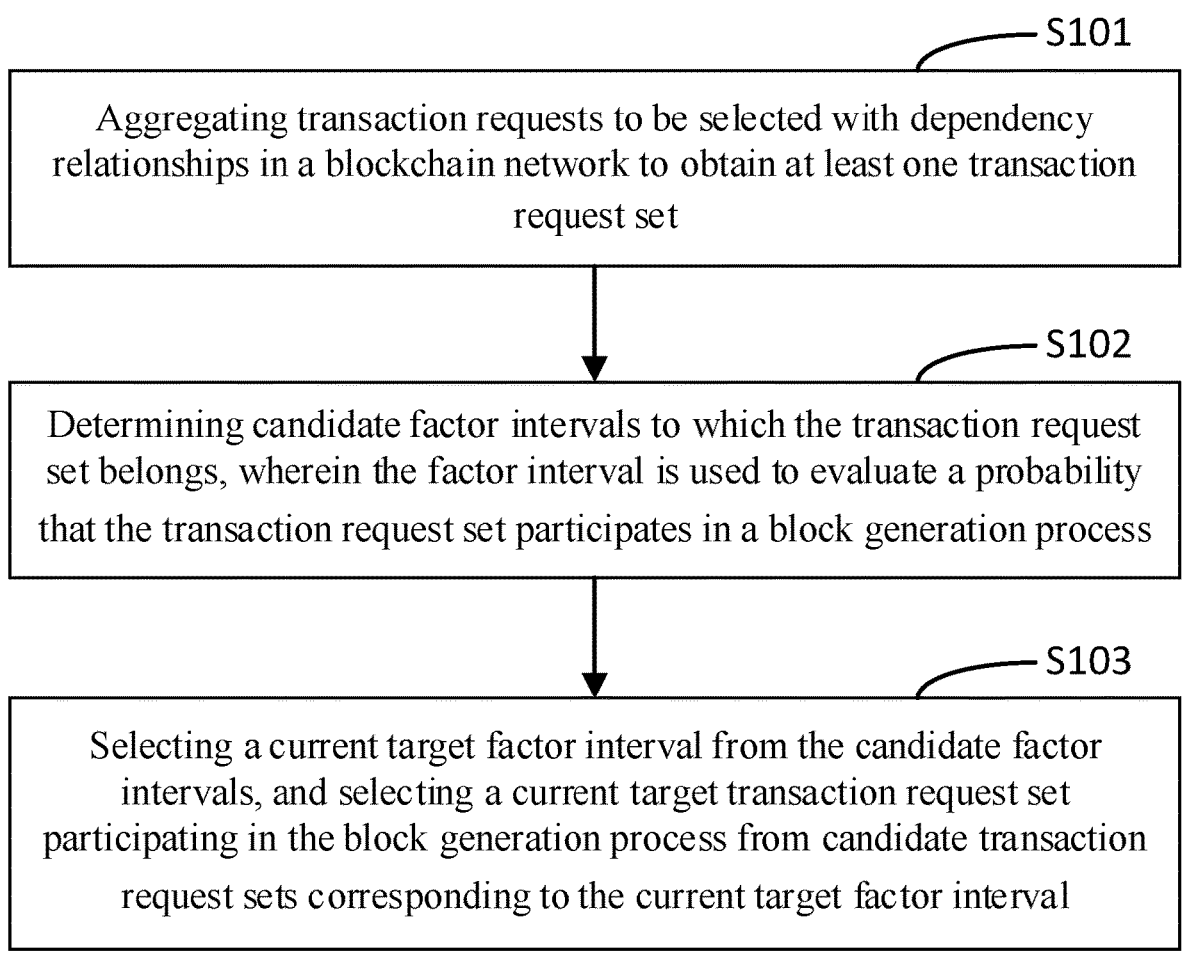
FIG. 1 is a flowchart of a method for processing transaction requests in a blockchain according to an embodiment of the present application.

FIG. 1 is a flowchart of a method for processing transaction requests in a blockchain according to an embodiment of the present application. The embodiments of the present application can be applied to such a situation on how to select transaction requests to be processed rationally and efficiently in a process of generating a block by a blockchain node with an accounting right (or called as a block output right). In addition, the solutions disclosed by the embodiments of the present application can be preferably applied to a blockchain network deployed with a consensus mechanism for block output competition, including but not limited to, an alliance chain network, an open chain network, etc. The methods disclosed in the embodiments of the present application can be performed by an apparatus for processing transaction requests in a blockchain. The apparatus may be implemented with software and/or hardware, and may be integrated on a blockchain node which may be deployed on any electronic device with computing capability.

As shown in FIG. 1, the method for processing transaction requests in a blockchain disclosed in an embodiment of the present application may include:

S101: aggregating transaction requests to be selected with dependency relationships in a blockchain network, to obtain at least one transaction request set.

Wherein, the dependency relationship between the transaction requests refers to a situation where a blockchain node needs to depend on a processing result of other transaction request(s) in a process of executing a certain transaction request, or an execution process of other transaction request(s) needs to depend on a processing result of a current transaction request. The transaction requests to be selected refer to those in the blockchain network which have not been selected by the blockchain node and have not been determined whether to participate in a block generation process. At least one transaction request set (or called as a transaction request sequence) is obtained by aggregating the transaction requests to be selected with dependency relationships in the blockchain network, and there exist dependency relationships among at least one transaction request in each transaction request set. The number of the transaction requests included in each transaction request set may depends on different situations.

Figure 2:
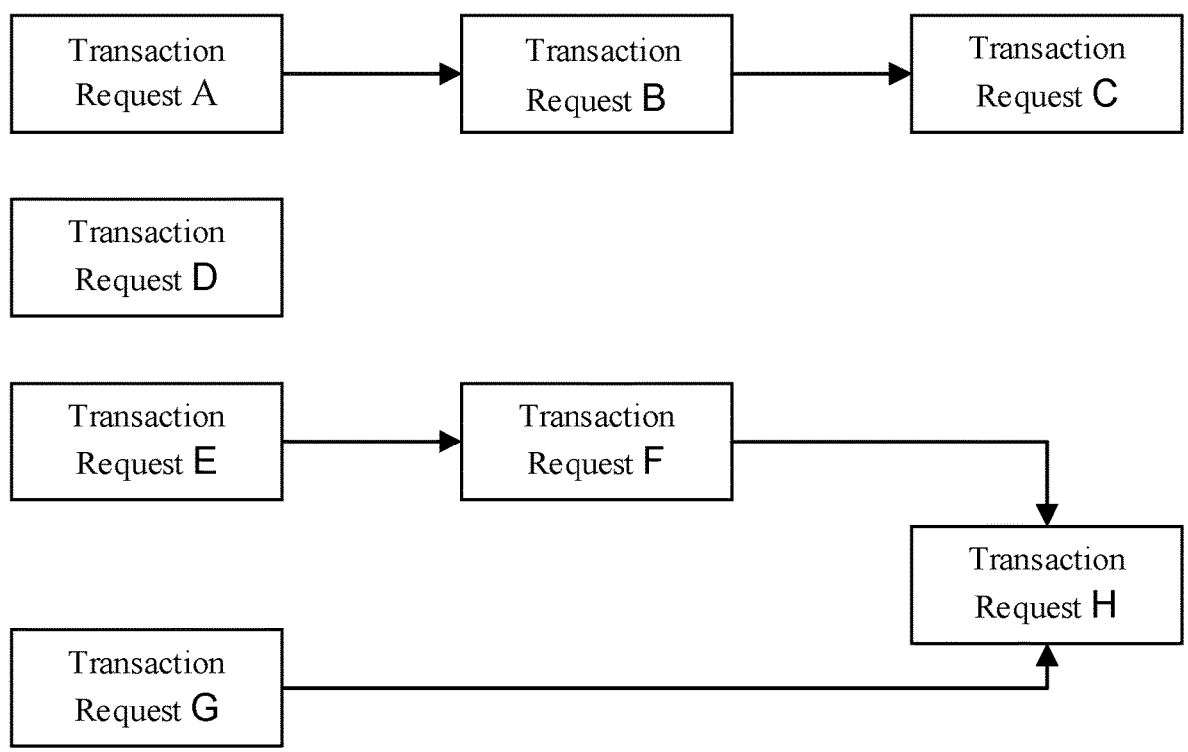
FIG. 2 is a schematic diagram of dependency relationships between a plurality of transaction requests according to an embodiment of the present application.

As an example, FIG. 2 shows a schematic diagram of dependency relationships between a plurality of transaction requests, which should not be understood as a specific limitation of an embodiment of the present application. As shown in FIG. 2, a transaction request A depends on a transaction request B, the transaction request B depends on a transaction request C, and the transaction request A, the transaction request B and the transaction request C can construct a transaction request set 1; a transaction request D is an independent transaction request and does not depend on other transaction requests, and can construct a transaction request set 2 by itself, a transaction request E depends on a transaction request F, the transaction request F depends on a transaction request H, a transaction request G also depends on the transaction request H, and thus the transaction request E, the transaction request F, the transaction request H and the transaction request G can construct a transaction request set 3.

S102: determining candidate factor intervals to which the transaction request set belongs, wherein the factor interval is used to evaluate a probability that the transaction request set participates in a block generation process.

In an embodiment of the present application, a plurality of candidate factor intervals may be preset, such as (0, N], (N, 2N], . . . , (x·N, (x+1)·N), where values of x and N can be set according to an actual situation. There is no overlap between upper limits or lower limits of the candidate factor intervals, and as a value of an upper limit or a lower limit of an interval increases, a probability that a transaction request set in this interval is selected to participate in the block generation process rises. Then, the candidate factor interval to which each transaction request set belongs is determined according to an attribute of the transaction request set. The attribute of the transaction request set may be any feature information that can be used to evaluate whether the transaction request set is selected to participate in the block generation process. For example, the attribute of the transaction request set may include one or more of the following items: the number of transaction requests included in the set, a payment voucher of the transaction request, a space occupancy (size) of the transaction request, a priority of the transaction request, etc. For example, an incentive factor of each transaction request set (i.e., an evaluation value of the transaction request set) may be determined according to an attribute of the transaction request set, and then the candidate factor intervals to which each transaction request set belongs may be determined according to the incentive factor.

Taking a single consideration factor as an example, when the number of transaction requests included in the transaction request set is within a preset threshold interval, it may be considered that the incentive factor of the transaction request set is large, i.e., the probability that the transaction request set is selected by the blockchain node to participate in the block generation process is high, where the threshold interval may be determined according to a time cost of executing each transaction request by the blockchain node and a time cost of generating a block by packaging, so that the blockchain node can comprehensively evaluate whether the time cost of executing each transaction request selected is rational in the block generation process; as a difference between a first number threshold and the number of transaction requests with a payment voucher exceeding a voucher threshold in the transaction request set increases, it may be regarded that the incentive factor of the transaction request set increases, where the payment voucher of the transaction request may also be called as a service fee, which represents a reward or income that the blockchain node can obtain after executing the transaction request. Therefore, from the perspective of profit, as the number of transaction requests with a high payment voucher in a transaction request set increases, the probability that the transaction request set is selected by the blockchain node to participate in the block generation process rises; as a difference between a second number threshold and the number of high-priority transaction requests in the transaction request set increases, it may be regarded that the incentive factor of the transaction request set increases, where the priority of the transaction request may be determined by a blockchain system according to a service type, generation time, importance, service value and other factors involved in the transaction request, or specified by the blockchain node itself, which is not specifically limited in an embodiment of the present application. All kinds of thresholds mentioned above may be adaptively set in practical applications, which is not specifically limited in an embodiment of the present application.

Based on the above explanation, further, the incentive factor of the transaction request set may be comprehensively determined based on at least two considerations. For example, the incentive factor of the transaction request set may be determined according to the difference between the first number threshold and the number of transaction requests with a payment voucher exceeding the voucher threshold, and the difference between the second number threshold and the number of high-priority transaction requests in the transaction request set. As the numbers of the transaction requests with the high payment voucher and of the high-priority transaction requests in the transaction request set increase, the incentive factor of the transaction request set increases. Usually, the payment voucher corresponding to the high-priority transaction request is also high.

Alternatively, for example, determining the incentive factor of the transaction request set according to the payment voucher and the space occupancy of the transaction request in the transaction request set may include, for example, calculating a total payment voucher of the transaction requests in the transaction request set, i.e., a sum of the payment vouchers of the transaction requests; calculating a total space occupancy of the transaction requests in the transaction request set, i.e., a sum of the space occupancies (sum_size) of the transaction requests; and taking a quotient value between the total payment voucher and the total space occupancy as the incentive factor of the transaction request set. At this time, the incentive factor may also be called as a cost performance of the transaction request set, and the blockchain node can weigh according to the space occupancies of the selected transaction requests and the incomes that can be obtained by executing these transaction requests, so as to ensure that the block space can be fully utilized and the rational income can be obtained, and then to maximize the income as much as possible, which is also an effective incentive strategy for the blockchain node to actively strive for an accounting right, thereby allowing a more effective and rational incentive calculation mode to be existed in the blockchain network, and ensuring the normal and timely block generation.

When the blockchain node selects a transaction request participating in the block generation process merely according to the amounts of the service fees, the dependency relationships between the transaction requests cannot be guaranteed, and the number of transaction requests executable by the blockchain node is also limited due to the limited block space when the space occupancies of the transaction requests with high service fees are large. As a result, although the service fee of an occasional transaction request is high, the number of transaction requests executable by the blockchain node is small, and finally, the reward or income comprehensively obtained may not be optimal. Therefore, there are still some irrational aspects in the selection of the transaction request by the blockchain node, i.e., from the perspective of profit, an effective incentive effect on the blockchain node to participate in the block generation cannot be realized. By comprehensively considering the payment voucher and the space occupancy of the transaction requests, it is possible to solve the irrational problem of selecting the transaction requests merely according to the service fees.

Further, based on the above technical solution, the determining the candidate factor interval to which the transaction request set belongs may include:

matching the candidate factor intervals to which the transaction request set belongs by traversing upper limits and lower limits of created factor intervals, based on an incentive factor of the transaction request set, wherein the incentive factor may be used to represent a reward obtained by a blockchain node executing the transaction requests in the transaction request set, or may be used to represent a probability that the transaction request set participates in the block generation process; and if not matched, newly creating candidate factor intervals to which the transaction request set belongs. That is, a candidate factor interval may be dynamically changed according to the generation of the transaction request set.

S103: selecting a current target factor interval from the candidate factor intervals, and selecting a current target transaction request set participating in the block generation process from candidate transaction request sets corresponding to the current target factor interval.

According to technical solutions of the embodiments of the present application, a target transaction request set participating in a block generation process is cumulatively determined through at least one cyclical selection, according to a circle logic of selecting a current target factor interval and selecting a current target transaction request set from candidate transaction request sets corresponding to the current target factor interval, and finally, blocks are generated by executing the transaction requests in the cumulatively determined target transaction request set, where there are dependency relationships between the transaction requests in the target transaction request set, which improves a rationality and a selection efficiency of a blockchain node in selecting the transaction requests in the block generation process, and improves a block output efficiency.

After the candidate factor intervals to which the transaction request set belongs is determined, the current target factor interval may be firstly selected from a plurality of candidate factor intervals according to a preset interval selection strategy, for example, a candidate factor interval with a largest interval upper limit value or interval lower limit value is preferentially selected. Then, a current target transaction request set is selected from a plurality of candidate transaction request sets corresponding to the current target factor interval according to a set selection strategy, for example, among the plurality of candidate transaction request sets, a set in which the transaction request has the largest space occupancy is preferentially selected as the current target transaction request set, where the set selection strategy may be determined according to the specific requirement of the attribute of the transaction request set in the service processing process. That is, any one of the factors such as the number of transaction requests included in the candidate transaction request set, the payment vouchers of the transaction requests, the space occupancies of the transaction requests and the priorities of the transaction requests, may be taken as the factor for selecting the current target transaction request set according to the current service requirement.

Further, after selecting the current target transaction request set participating in the block generation process, the method disclosed in an embodiment of the present application may further include:

calculating a total space occupancy of the current target transaction request set and a target transaction request set selected in a current block generation cycle;

if the obtained total space occupancy is less than a block space threshold, determining at least one new transaction request set according to dependency relationships between remaining transaction requests to be selected, and determining a new current target transaction request set according to the new transaction request set, i.e., repeating the operations S101-S103.

Wherein, the block space threshold is related to a block space size in the blockchain network and may be used to reflect an upper limit of the block space size; the remaining transaction requests to be selected include the transaction requests in the blockchain network except those in the current target transaction request set and the target transaction request set selected in the current block generation cycle.

In a case where the final transaction request cumulatively determined meet a block generation condition after at least one cyclical selection of the target transaction request set, the blockchain node can execute each selected transaction request to generate a current block and add it to the blockchain.

According to the technical solution of an embodiment of the present application, in each cyclical selection process of the target transaction request set, firstly, a plurality of transaction request sets are obtained according to the dependency relationships between the transaction requests to be selected, and the transaction request sets are classified according to the candidate factor intervals to which the transaction request sets belong, then the current target factor interval is selected from the plurality of candidate factor intervals, and the current target transaction request set is selected from the candidate transaction request sets corresponding to the current target factor interval to participate in the block generation, which solves the problem in the prior art that the block generation efficiency is affected by the irrational transaction requests selected by the blockchain node to participate in the block generation process, caused by the rupture of the dependency relationships between the transaction requests, improves a rationality and a selection efficiency of the blockchain node in selecting the transaction requests in the block generation process, and improves a block output efficiency.

Based on the above technical solution, optionally, aggregating the transaction requests to be selected with dependency relationships in a blockchain network to obtain at least one transaction request set may include:

constructing a directed acyclic graph between the transaction requests to be selected in the blockchain network according to the dependency relationships between the transaction requests to be selected; and aggregating the transaction requests to be selected with the dependency relationships by using the directed acyclic graph to obtain the at least one transaction request set.

Specifically, each transaction request to be selected may be regarded as a node of the directed acyclic graph, and the dependency relationships between the transaction requests to be selected may be regarded as edges of the directed acyclic graph. By constructing the directed acyclic graph, the dependency relationships between the transaction requests to be selected can be managed orderly. In addition, the directed acyclic graph has a high extendibility and can be changed flexibly with the increase or decrease of the transaction requests to be selected. Further, the transaction request set may include leaf transaction requests and respective non-leaf transaction requests that the leaf transaction requests depend on; and the leaf transaction requests in different transaction request sets are also different.

Example 1: taking the dependency relationships between the plurality of transaction requests shown in FIG. 2 as an example, three transaction request sets can be determined as follows:

transaction request set 1: transaction request A→transaction request B→transaction request C;

transaction request set 2: transaction request D;

transaction request set 3: transaction request E→transaction request F→transaction request H, and transaction request G→transaction request H.

Wherein, in the transaction request set 1, the transaction request A is a leaf transaction request, the transaction request B and the transaction request C are non-leaf transaction requests that the leaf transaction request depends on;

in the transaction request set 2, the transaction request D is an independent transaction request;

in the transaction request set 3, the transaction request E and the transaction request G are leaf transaction requests, the transaction request F and the transaction request H are non-leaf transaction requests that the leaf transaction request E depends on, and the transaction request H is a non-leaf transaction request that the leaf transaction request G depends on.

Example 2: assuming that one transaction request to be selected may correspond to one transaction, and the dependency relationships between a plurality of transactions are as follows: a transaction 2 depends on a transaction 1, a transaction 3 depends on the transaction 2, and a transaction 4 depends on the transaction 3. Then, a transaction request set or a transaction sequence may be expressed as follows:

transaction sequence 1: transaction 1;

transaction sequence 2: transaction 2→transaction 1;

transaction sequence 3: transaction 3→transaction 2→transaction 1;

transaction sequence 4: transaction 4→transaction 3→transaction 2→transaction 1;

in which, in the transaction sequence 1, the transaction 1 is an independent transaction;

in the transaction sequence 2, the transaction 2 is a leaf transaction, and the transaction 1 is a non-leaf transaction (or called as an ancestor transaction);

in the transaction sequence 3, the transaction 3 is a leaf transaction, and the transaction 2 and the transaction 1 are non-leaf transactions;

in transaction sequence 4, the transaction 4 is a leaf transaction, and the transaction 3, the transaction 2 and the transaction 1 are non-leaf transactions.

In addition, it can be seen from the above examples that when there is a same dependency relationship between a plurality of transaction requests to be selected, each transaction request set includes a most initial dependent transaction request (or called as an oldest ancestor transaction request). For example, in the above example, each of the transaction sequences 2 to 4 includes the oldest ancestor transaction, i.e., the transaction 1.

After one selection cycle of the current target transaction request set is ended, the transaction requests included in the current target transaction request set may be removed from the transaction requests to be selected in the current blockchain network to obtain remaining transaction requests to be selected, and then a directed acyclic graph is reconstructed based on the dependency relationships between the remaining transaction requests to be selected, so as to determine a new current target transaction request set.

Figure 3:
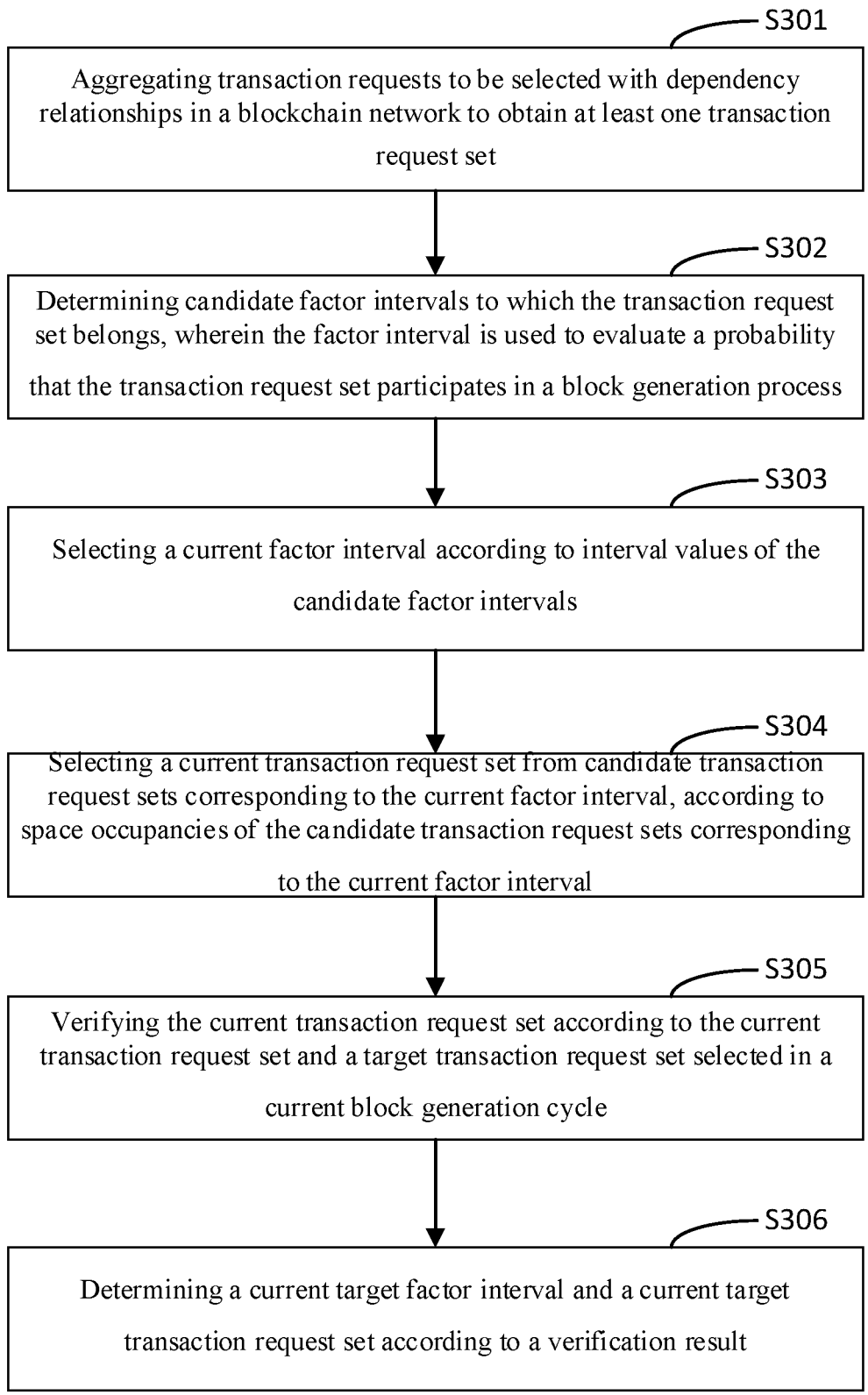
FIG. 3 is a flowchart of another method for processing transaction requests in a blockchain according to an embodiment of the present application.

FIG. 3 is a flowchart of another method for processing transaction requests in a blockchain according to an embodiment of the present application. The method is further optimized and extended based on the above technical solution and can be combined with the above optional embodiments. As shown in FIG. 3, the method may include:

S301: aggregating transaction requests to be selected with dependency relationships in a blockchain network to obtain at least one transaction request set.

S302: determining candidate factor intervals to which the transaction request set belongs, wherein the factor interval is used to evaluate a probability that the transaction request set participates in a block generation process.

Wherein, an incentive factor of the transaction request set may be determined according to payment vouchers and space occupancies of the transaction requests in the transaction request set. At this time, the incentive factor may also be called as a cost performance of the transaction request set, which may represent a reward obtained by a blockchain node by executing the transaction request in the transaction request set. Then, a candidate factor interval to which the transaction request set belongs is matched by traversing upper limits and lower limits of created factor intervals based on the incentive factor of the transaction request set. If not matched, candidate factor intervals to which the transaction request set belongs are newly created. That is, the candidate factor interval may be dynamically changed according to the generation of the transaction request set.

S303: selecting a current factor interval according to interval values of the candidate factor intervals.

For example, a candidate factor interval with a largest interval upper limit value or interval lower limit value may be preferentially selected as the current factor interval.

S304: selecting a current transaction request set from candidate transaction request sets corresponding to the current factor interval, according to space occupancies of the candidate transaction request sets corresponding to the current factor interval.

Specifically, among the candidate transaction request sets corresponding to the current factor interval, the space occupancies of the candidate transaction request sets may be sorted to determine the current transaction request set according to a sorting result. For example, the space occupancies of the candidate transaction request sets are sorted in a descending order, and a candidate transaction request ranked first is preferably used as the current transaction request set. Alternatively, among the candidate transaction request sets corresponding to the current factor interval, a candidate transaction request set with a space occupancy larger than a space occupancy threshold is determined as the current transaction request set, wherein the space occupancy threshold may be flexibly set. For example, a candidate transaction request set with a largest space occupancy may be selected as the current transaction request set according to the space occupancy threshold.

The space size of each interval in the blockchain is relatively fixed. By selecting the current transaction request set according to the space occupancies of the candidate transaction request sets, it is possible to realize a preferential selection of a candidate transaction request set with a large space occupancy. Based on the full use of the block space, it can also reduce the selection times of the transaction requests participating in the block generation process to a certain extent, thereby saving the time cost (computing power) for selecting the transaction requests by the blockchain node, and balancing the node income and the computing power consumption. For the blockchain network deployed with a consensus mechanism for block output competition, it may enable the blockchain node to have enough computing power to compete for the accounting right, so as to avoid the failure in competing for the accounting right due to a large consumption of the computing power for selecting the transaction requests. In addition, the number of the selected transaction request sets is reduced, and relatively, a total number of the cumulatively selected transaction requests can be reduced, so that the blockchain node consumes less computing power when generating the blocks.

S305: verifying the current transaction request set according to the current transaction request set and a target transaction request set selected in a current block generation cycle.

S306: determining the current target factor interval and the current target transaction request set according to a verification result.

Specifically, the current transaction request set may be verified according to a preset verification strategy, such as until the current time, whether the number of the transaction request sets or the number of the transaction requests cumulatively selected by the blockchain node exceeds a corresponding number threshold, or whether the total space occupancy of the transaction request sets cumulatively selected by blockchain node exceeds a block space threshold, where the block space threshold is related to the block space size in the blockchain network, and may be used to reflect the upper limit of the block space size.

For example, verifying the current transaction request set according to the current transaction request set and the target transaction request set selected in a current block generation cycle may include:

calculating a total space occupancy of the current transaction request set and the target transaction request set selected in the current block generation cycle; and verifying the current transaction request set according to a relationship between the total space occupancy and the block space threshold.

If until the current time, the number of the transaction request sets or the number of the transaction requests cumulatively selected by the blockchain node does not exceed a corresponding number threshold, or the total space occupancy of the transaction request sets cumulatively selected by blockchain node does not exceed the block space threshold, etc., it is considered that the verification is successful, the current factor interval may be used as the current target factor interval, and the current transaction request set may be used as the current target transaction request set. If the verification is failed, it is necessary to redetermine the current target factor interval and the current target transaction request set based on remaining candidate transaction request sets or remaining candidate factor intervals corresponding to the current factor interval, until the block generation conditions are met, wherein the remaining candidate transaction request sets corresponding to the current factor interval include the transaction request sets corresponding to the current factor interval except the current factor interval failed in the verification, and the remaining candidate factor intervals include the candidate factor intervals except the current factor interval.

According to the technical solution of an embodiment of the present application, in the process of each cyclical selection of the target transaction request set, after the current factor interval is selected according to the interval values of the candidate factor intervals to which the transaction request sets belong, and the current transaction request set is selected from the candidate transaction request sets corresponding to the current factor interval according to the space occupancy of the candidate transaction request set corresponding to the current factor interval, the current transaction request set is verified based on the transaction request sets cumulatively selected until the current time, and the current target factor interval and the current target transaction request set are determined according to a verification result, which solves the problem in the prior art that the block generation efficiency is affected by the irrational transaction requests selected by the blockchain node to participate in the block generation process, caused by the rupture of the dependency relationships between the transaction requests, improves the selection efficiency of the blockchain node in selecting the transaction requests in the block generation process, and ensures the rationality of the selection of the target transaction request set in the process of each cyclical selection. In particular, a candidate factor interval to which the transaction request set belong is determined according to the payment vouchers and the space occupancies of the transaction requests in the transaction request sets, and then the currently selected transaction request set is verified according to a fact whether the total space occupancy of the transaction request sets cumulatively selected by the blockchain node until the current time exceeds the block space threshold, thereby realizing the effects of sufficiently considering the profit of the blockchain node and fully utilizing the block space are realized.

Based on the above technical solution, optionally, determining the current target factor interval and the current target transaction request set according to the verification result may include:

using the current factor interval as the current target factor interval if the verification of the current transaction request set is failed, and determining the current target transaction request set based on remaining candidate transaction request sets corresponding to the current factor interval; wherein the remaining candidate transaction request sets include transaction request sets corresponding to the current factor interval except the current factor interval failed in the verification; for example, the remaining candidate transaction request sets may be considered in a descending order according to the space occupancies of the transaction request sets.

Further, determining the current target factor interval and the current target transaction request set according to the verification result may also include:

determining the current target factor interval based on remaining candidate factor intervals and determining the current target transaction request set based on candidate transaction request sets corresponding to the newly determined current target factor interval, if the current target transaction request set cannot be determined from the remaining candidate transaction request sets corresponding to the current factor interval; wherein the remaining candidate factor intervals may include candidate factor intervals except the current factor interval; for example, the remaining candidate factor intervals may be considered in a descending order of the interval upper limit values or the interval lower limit values.

That is, in a process of the cyclical determination of the target transaction request set, the current target transaction request set is preferably determined by a plurality of selections and verifications in the candidate transaction request sets corresponding to the current target factor interval; next, it is considered to determine the current target transaction request set among the candidate transaction request sets corresponding to the remaining candidate factor intervals, which is helpful for the blockchain node to maintain a high selection efficiency even if the current target transaction request set is determined by a plurality of selections. In addition, in an example where the incentive factor of the transaction request set can be used to represent the reward obtained by the blockchain node by executing the transaction request in the transaction request set, the candidate transaction request set corresponding to the candidate factor interval with the largest interval upper limit value or interval lower limit value will bring relatively large income to the blockchain node. By selecting the current target transaction request set in a sequence of the current target factor interval and the remaining candidate factor intervals, it can ensure that the rational profit of the blockchain node is maximized and the profit loss is minimized.

Figure 4:
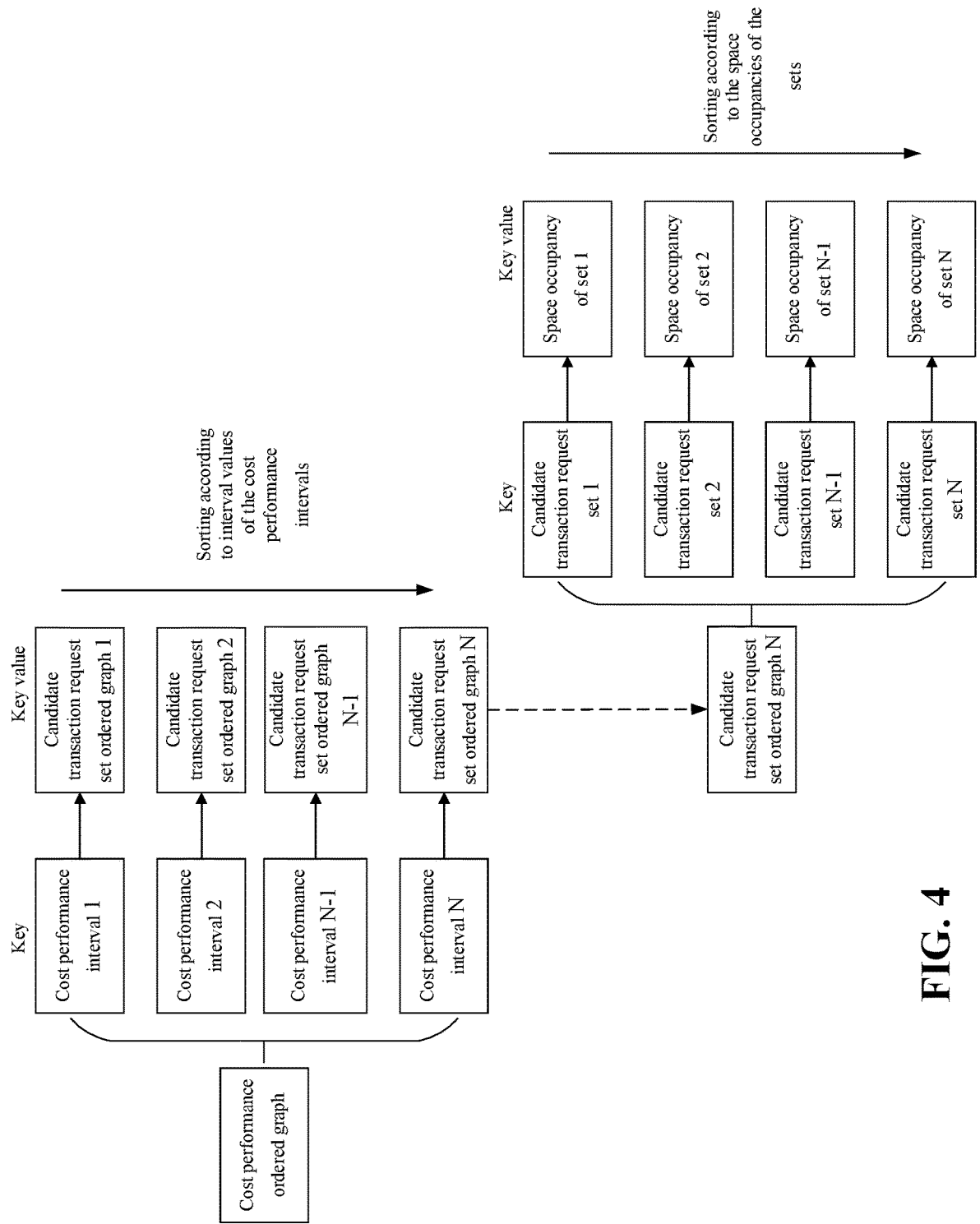
FIG. 4 is a schematic diagram of a cost performance ordered graph and a candidate transaction request set ordered graph according to an embodiment of the present application.

Based on the above technical solution, when the incentive factor of the transaction request set is determined according to payment vouchers and space occupancies of transaction requests in the transaction request set, the incentive factor may be called as a cost performance of the transaction request set. Thus, as an example, FIG. 4 shows a schematic diagram of a cost performance ordered graph and a candidate transaction request set ordered graph, which should not be understood as specific limitations of an embodiment of the present application. In which, the cost performance ordered graph means that the candidate factor intervals of the transaction request set are sorted according to interval values, such as upper limit values or lower limit values, to obtain an interval sorting graph, which, for example, may include candidate factor intervals 1, 2, . . . N or cost performance intervals 1, 2, . . . N, where N is an integer. The candidate factor intervals and the corresponding candidate transaction request sets may be stored in a key-value relationship, and for example, the candidate factor intervals are taken as keys and the candidate transaction request sets corresponding to the intervals are taken as key values. Further, a plurality of candidate transaction request sets corresponding to each candidate factor interval N or cost performance interval N may be sorted in a descending order according to the space occupancy of each candidate transaction request set, to obtain a candidate transaction request set ordered graph N. Each candidate transaction request set ordered graph may also be stored in the key-value form. For example, in a same candidate factor interval, a set serial or a number of each candidate transaction request set is taken as a key, and the space occupancy of each candidate transaction request set is taken as a key value. Every time a candidate factor interval or a cost performance interval is newly created, or a candidate transaction request set in the interval changes, the candidate transaction request sets currently corresponding to the interval are sorted according to the space occupancies thereof, to obtain the candidate transaction request set ordered graph.

By comprehensively utilizing the cost performance ordered graph and the candidate transaction request set ordered graph, the transaction requests to be selected can be effectively managed in a process of selecting the target transaction request set, and a foundation can be laid for the efficient selection of the target transaction request set.

Figure 5:
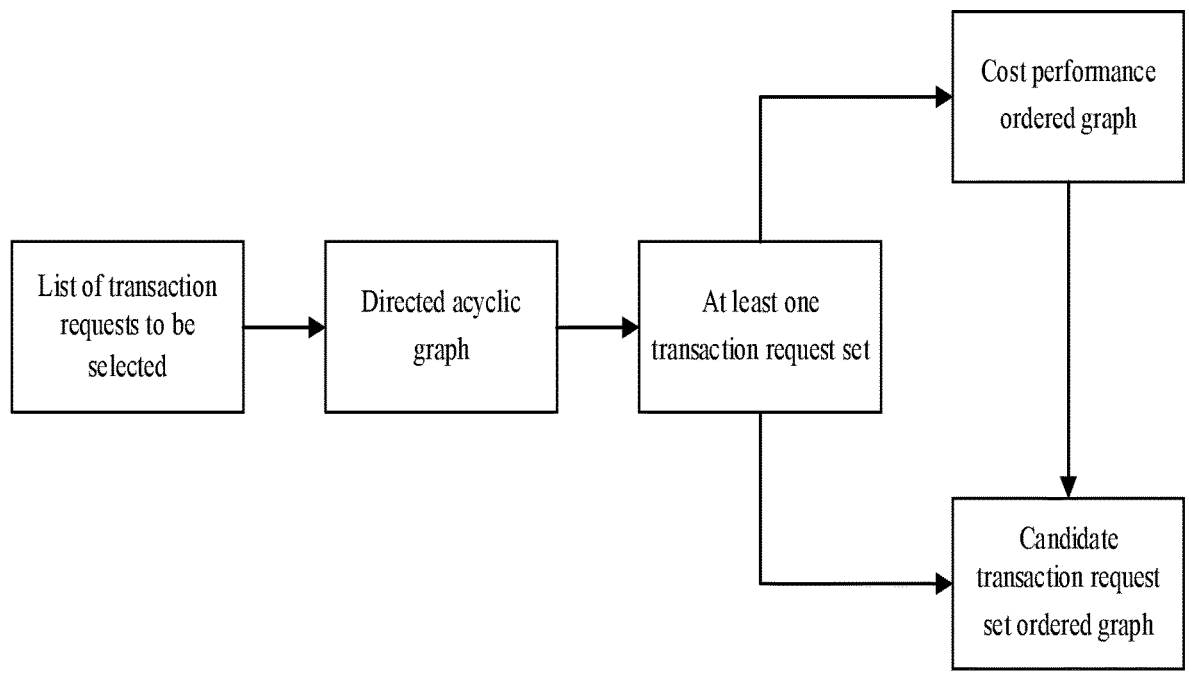
FIG. 5 is an architecture diagram of transaction request processing in a blockchain according to an embodiment of the present application.

FIG. 5 is an architecture diagram of transaction request processing in a blockchain according to an embodiment of the present application. As shown in FIG. 5, in a generation cycle of a current block, transaction requests to be selected in a blockchain network may be stored in a form of a list of transaction requests to be selected, and a directed acyclic graph is constructed according to dependency relationships between the transaction request sets to be selected to determine at least one transaction request set; next, candidate factor intervals to which a transaction request set belongs are determined according to an incentive factor of the transaction request set; further, a current target factor interval is determined using the constructed cost performance ordered graph, and a current target transaction request set is determined using the candidate transaction request set ordered graph, thereby improving the efficiency of the blockchain node in selecting the transaction request sets participating in the block generation process. In addition, with the determination of the current target transaction request set, the directed acyclic graph, the cost performance ordered graph and the candidate transaction request set ordered graph can be adaptively changed according to the remaining transaction requests to be selected in the blockchain network.

Figure 6:
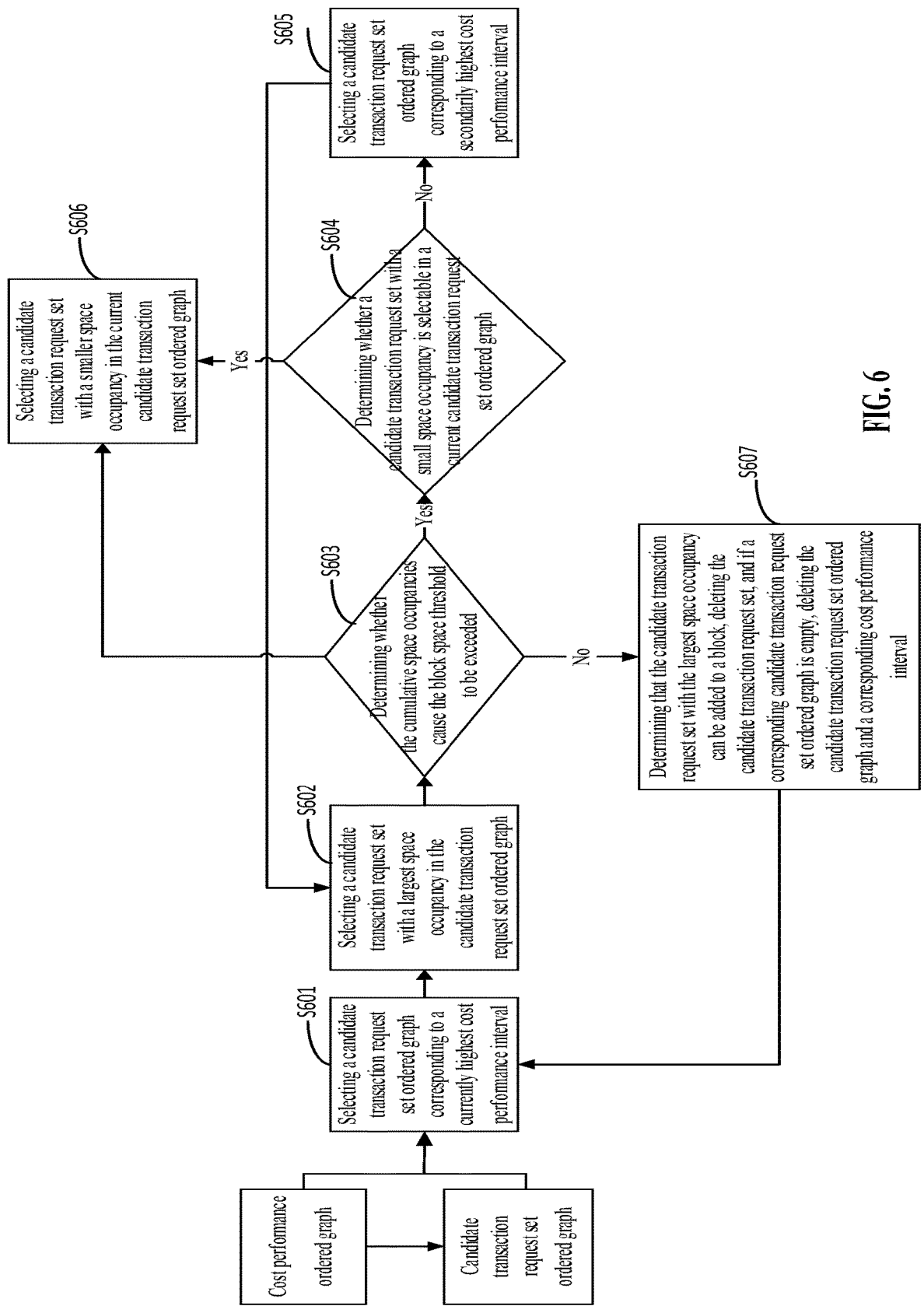
FIG. 6 is a flowchart of another method for processing transaction requests in a blockchain according to an embodiment of the present application.

FIG. 6 is a flowchart of another method for processing transaction requests in a blockchain according to an embodiment of the present application. The method is further optimized and extended based on the above technical solution and can be combined with the above optional embodiments. Specifically, taking an execution process of a limited number of cycles as an example, FIG. 6 exemplarily illustrates a selection process of a current target transaction request set in an embodiment of the present application, which should not be understood as a specific limitation of an embodiment of the present application. As shown in FIG. 6, the method may include:

S601: selecting a candidate transaction request set ordered graph corresponding to a currently highest cost performance interval.

S602: selecting a candidate transaction request set with a largest space occupancy in the candidate transaction request set ordered graph.

It should be noted that in the candidate transaction request set ordered graph corresponding to the currently highest cost performance interval, the candidate transaction request set with the largest space occupancy is preferably used as the current target transaction request set, in order to reduce the time cost of selecting the transaction request by the blockchain node, balance the income and the time cost (computing power), and ensure its own accounting right. Because if the candidate transaction request set with the highest cost performance is selected each time in a same cost performance interval, there is a risk of a high processing cost although a maximum profit can be guaranteed. For example, the blockchain node has a total income of 100 when handling 100 transactions with very small space occupancies, and a total income of 99 when handling one transaction with a largest space occupancy, while the time cost for processing the transaction with the largest space occupancy is only one percent of that of the former. In a scenario of block output competition, if the blockchain node spends all the time cost on finding an optimal transaction with a largest profit, the accounting right may not be grabbed. Therefore, it is necessary to balance the profit and the time cost to achieve a balanced effect.

S603: judging whether the cumulative space occupancies cause the block space threshold to be exceeded.

If so, performing S604; and if not, performing S607.

S604: determining whether a candidate transaction request set with a small space occupancy is selectable in a current candidate transaction request set ordered graph.

If so, performing S606; and if not, performing S605.

S605: selecting a candidate transaction request set ordered graph corresponding to a secondarily highest cost performance interval.

S606: selecting a candidate transaction request set with a small space occupancy in the current candidate transaction request set ordered graph.

Specifically, it is possible to select a candidate transaction request set with a secondarily largest space occupancy in the candidate transaction request set ordered graph corresponding to the currently highest cost performance interval, and then return to S603 to judge again whether the cumulative space occupancies cause the block space threshold to be exceeded. The operations are cyclically repeated until a candidate transaction request set that can participate in the block generation process is selected, so that the space occupancies of the sets cumulatively selected will not cause the block space threshold to be exceeded.

S607: determining that the candidate transaction request set with the largest space occupancy can be added to a block, deleting the candidate transaction request set, and if a corresponding candidate transaction request set ordered graph is empty, deleting the candidate transaction request set ordered graph and a corresponding cost performance interval.

When the cumulatively selected target transaction request sets after a plurality of cyclical selections satisfy a block generation condition, for example, until the current time, a total space occupancy of the cumulatively selected target transaction request sets reach the block space threshold, it is regarded that the block space can be fully utilized, and the cumulatively selected transaction requests can be executed to generate blocks.

According to a technical solution of an embodiment of the present application, in the process of selecting the target transaction request set, the cost performance ordered graph and the candidate transaction request set ordered graph are comprehensively utilized, which not only realizes the effective management of the transaction requests to be selected, but also improves a rationality and a selection efficiency of the blockchain node in selecting the transaction requests in the block generation process, improving a block output efficiency. Meanwhile, from the perspective of profit gaining, it effectively guarantees the profit of the blockchain node with an accounting right, and is also an effective incentive strategy for the blockchain node to actively strive for the accounting right.

Figure 7:
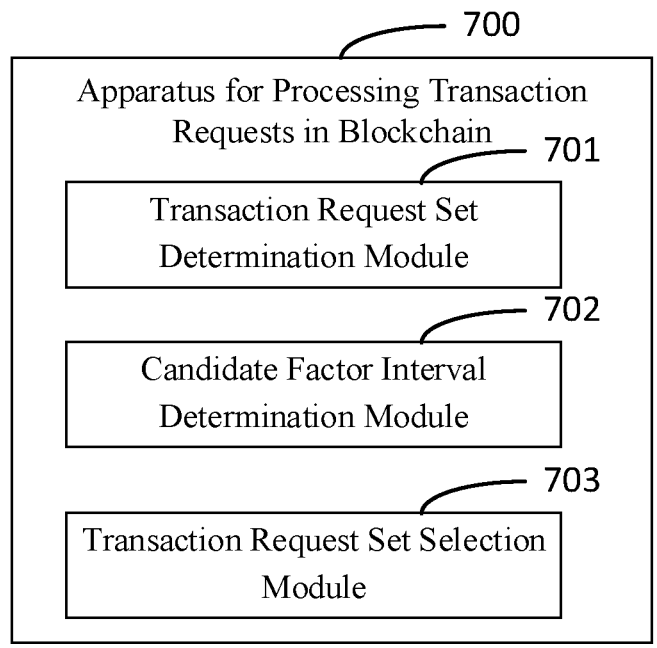
FIG. 7 is a structural diagram of an apparatus for processing transaction requests in a blockchain according to an embodiment of the present application.

FIG. 7 is a structural diagram of an apparatus for processing transaction requests in a blockchain according to an embodiment of the present application. An embodiment of the present application can be applied to such a situation on how to select transaction requests to be processed rationally and efficiently in a process of generating a block by a blockchain node. The apparatus disclosed in an embodiment of the present application may be implemented by software and/or hardware, and may be integrated on a blockchain node which may be deployed on any electronic device with a computing capability.

As shown in FIG. 7, an apparatus 700 for processing transaction requests in a blockchain disclosed in an embodiment of the present application may include a transaction request set determination module 701, a candidate factor interval determination module 702 and a transaction request set selection module 703, wherein:

the transaction request set determination module 701 is configured for aggregating transaction requests to be selected with dependency relationships in a blockchain network, to obtain at least one transaction request set;

the candidate factor interval determination module 702 is configured for determining candidate factor intervals to which the transaction request set belongs, wherein the factor interval is used to evaluate a probability that the transaction request set participates in a block generation process; and the transaction request set selection module 703 is configured for selecting a current target factor interval from the candidate factor intervals, and selecting a current target transaction request set participating in the block generation process from candidate transaction request sets corresponding to the current target factor interval.

Optionally, the candidate factor interval determination module 702 may include:

a matching unit configured for matching the candidate factor intervals to which the transaction request set belongs by traversing upper limits and lower limits of created factor intervals, based on an incentive factor of the transaction request set, wherein the incentive factor is used to represent a reward obtained by a blockchain node executing the transaction requests in the transaction request set; and a creation unit configured for newly creating candidate factor intervals to which the transaction request set belongs, if not matched.

Optionally, the transaction request set selection module 703 may include:

an interval selection unit configured for selecting a current factor interval according to interval values of the candidate factor intervals;

a set selection unit configured for selecting a current transaction request set from candidate transaction request sets corresponding to the current factor interval, according to space occupancies of the candidate transaction request sets corresponding to the current factor interval;

a verification unit configured for verifying the current transaction request set according to a target transaction request set selected in a current block generation cycle and the current transaction request set; and a determination unit configured for determining the current target factor interval and the current target transaction request set according to a verification result.

Optionally, the verification unit may include:

a calculation subunit configured for calculating a total space occupancy of the target transaction request set selected in the current block generation cycle and the current transaction request set; and a verification subunit configured for verifying the current transaction request set according to a relationship between the total space occupancy and a block space threshold.

Optionally, the determination unit may include:

a first determination subunit configured for using the current factor interval as the current target factor interval in a case where the verification of the current transaction request set is failed, and determining the current target transaction request set based on remaining candidate transaction request sets corresponding to the current factor interval;

wherein the remaining candidate transaction request sets may include transaction request sets corresponding to the current factor interval except the transaction request set failed in the verification.

The first determination subunit may further be configured for using the current factor interval as the current target factor interval and the current transaction request set as the current target transaction request set, in a case where the verification of the current transaction request set is successful.

Optionally, the determination unit may further include:

a second determination subunit configured for determining the current target factor interval based on remaining candidate factor intervals and determining the current target transaction request set based on candidate transaction request sets corresponding to the newly determined current target factor interval, in a case where the current target transaction request set cannot be determined from the remaining candidate transaction request sets corresponding to the current factor interval;

wherein the remaining candidate factor intervals may include candidate factor intervals except the current factor interval.

Optionally, the set selection unit may be specifically configured for:

among the candidate transaction request sets corresponding to the current factor interval, sorting the space occupancies of the candidate transaction request sets to determine the current transaction request set according to a sorting result; or among the candidate transaction request sets corresponding to the current factor interval, determining a candidate transaction request set with a space occupancy larger than a space occupancy threshold as the current transaction request set.

Optionally, the apparatus disclosed in an embodiment of the present application may further include:

an incentive factor determination module configured for determining an incentive factor of the transaction request set according to payment vouchers and space occupancies of transaction requests in the transaction request set, before the candidate factor interval determination module 702 performs the operation of determining the candidate factor intervals to which the transaction request set belongs.

Optionally, the transaction request set determination module 701 may include:

a directed acyclic graph construction unit configured for constructing a directed acyclic graph between the transaction requests to be selected in the blockchain network according to the dependency relationships between the transaction requests to be selected; and a transaction request set determination unit configured for aggregating the transaction requests to be selected with the dependency relationships by using the directed acyclic graph, to obtain the at least one transaction request set.

Optionally, the transaction request set may e leaf transaction requests and respective non-leaf transaction requests that the leaf transaction requests depend on; and the leaf transaction requests in different transaction request sets are also different.

Optionally, a consensus mechanism for block output competition may be deployed in the blockchain network.

The apparatus 700 for processing the transaction requests in the blockchain disclosed in an embodiment of the present application can perform any method for processing transaction requests in a blockchain disclosed in an embodiment of the present application, has corresponding functional modules to perform the method, and achieves corresponding advantageous effects. The content not described in detail in the apparatus embodiments of the present application may refer to the description in any method embodiment of the present application.

According to an embodiments of the present application, the present application further provides an electronic device and a readable storage medium.

Figure 8:
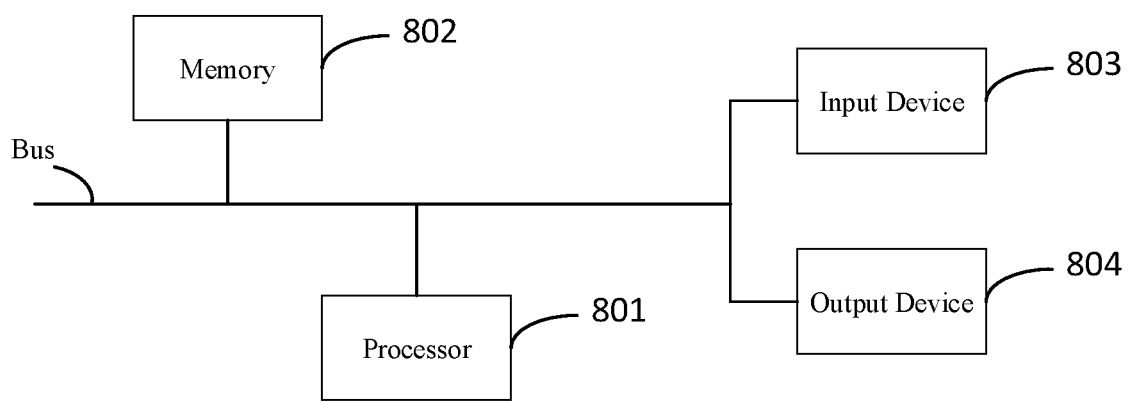
FIG. 8 is a block diagram of an electronic device according to an embodiment of the present application.

FIG. 8 is a block diagram of an electronic device for implementing a method for processing transaction requests in a blockchain according to an embodiment of the present application. The electronic device is intended to represent various kinds of digital computers, such as a laptop computer, a desktop computer, a workstation, a personal digital assistant, a server, a blade server, a mainframe computer, and other suitable computers. The electronic device may also represent various kinds of mobile devices, such as a personal digital processor, a cellular phone, a smart phone, a wearable device and other similar computing devices. The components illustrated herein, connections and relationships therebetween, and functions thereof are merely examples, and are not intended to limit the implementation of the present application described and/or claimed herein.

As shown in FIG. 8, the electronic device includes: one or more processors 801, a memory 802, and interfaces for connecting various components, including a high-speed interface and a low-speed interface. The various components are connected to each other by different buses, and may be mounted on a common mainboard or mounted in other ways as required. The processor may process an instruction executed in the electronic device, including instruction stored in or on the memory to display Graphical User Interface (GUI) graphical information on an external input/output device (e.g., a display device coupled to an interface). In other embodiments, if necessary, a plurality of processors and/or a plurality of buses may be used together with a plurality of memories. Similarly, a plurality of electronic devices may be connected, and each device provides some necessary operations (e.g., used as a server array, a group of blade servers, or a multi-processor system). In FIG. 8, one processor 801 is taken as an example.

The memory 802 is a non-transitory computer readable storage medium provided by the present application. The memory stores instructions executable by at least one processor, so that the at least one processor can execute the method for processing transaction requests in a blockchain provided by the present application. The non-transitory computer readable storage medium of the present application stores a computer instruction for enabling a computer to execute the method for processing transaction requests in a blockchain provided by the present application.

As a non-transitory computer readable storage medium, the memory 802 may be configured to store a non-transitory software program, a non-transitory computer executable program and module, such as a program instruction/module corresponding to the method for processing transaction requests in a blockchain in an embodiments of the present application (e.g., the transaction request set determination module 701, the candidate factor interval determination module 702 and the transaction request set selection module 703 as shown in FIG. 7). The processor 801 executes various functional applications and data processing of the electronic device by running the non-transitory software programs, instructions and modules stored in the memory 802, thereby realizing the method for processing transaction requests in a blockchain in the above method embodiments.

The memory 802 may include a program storage area and a data storage area, wherein the program storage area may store an operating system, and an application program required by at least one function; and the data storage area may store data created according to the use of the electronic device. In addition, the memory 802 may include a high-speed random-access memory, and may also include a non-transitory memory, such as at least one magnetic disk memory device, a flash memory device, or any other non-transitory solid memory device. In some embodiments, the memory 802 optionally includes a memory remotely located relative to the processor 801, and the remote memory may be connected to the electronic device for implementing the method for processing transaction requests in a blockchain in an embodiment of the present application through a network. Examples of the network include, but are not limited to, the Internet, an intranet, a local area network, a mobile communication network and combinations thereof.

The electronic device for implementing the method for processing transaction requests in a blockchain in an embodiment of the present application may further include: an input device 803 and output device 804. The processor 801, the memory 802, the input device 803, and the output device 804 may be connected by buses or in other ways, and the bus connection is taken as an example in FIG. 8.

The input device 803 may receive input digital or character information, and generate a key signal input related to a user setting and a function control of the electronic device for implementing the method for processing transaction requests in a blockchain in an embodiment of the present application. The input device 803 for example may be a touch screen, a keypad, a mouse, a track pad, a touch pad, an indicator stick, one or more mouse buttons, a trackball, a joystick, etc. The output device 804 may include a display device, an auxiliary lighting apparatus, a haptic feedback apparatus, etc., wherein the auxiliary lighting apparatus for example is a Light Emitting Diode (LED), and the haptic feedback apparatus for example is a vibration motor. The display device may include, but is not limited to, a liquid crystal display (LCD), an LED display, and a plasma display. In some embodiments, the display device may be a touch screen.

Various embodiments of the system and technology described here may be implemented in a digital electronic circuit system, an integrated circuit system, an Application Specific Integrated Circuit (ASIC), computer hardware, firmware, software, and/or combinations thereof. These various embodiments may be implemented in one or more computer programs executable and/or interpretable on a programmable system including at least one programmable processor, and the programmable processor may be a dedicated or general programmable processor and capable of receiving and transmitting data and instructions from and to a storage system, at least one input device, and at least one output device.

The computing program (also called as program, software, software application, or code) include machine instructions of the programmable processor, and may be implemented with an advanced procedural and/or an object-oriented programming language, and/or an assembly/machine language. As used herein, the terms 'machine-readable medium' and 'computer readable medium' refer to any computer program product, device, and/or apparatus (e.g., a magnetic disk, an optical disk, a memory and a programmable logic device (PLD)) for providing the machine instruction and/or data to the programmable processor, including a machine-readable medium that receives a machine instruction as a machine-readable signal. The term 'machine readable signal' refers to any signal for providing the machine instruction and/or data to the programmable processor.

In order to provide an interaction with a user, the system and the technology described here may be implemented on a computer having a display apparatus (e.g., a cathode ray tube (CRT) or an LCD monitor) for displaying information to the user, and a keyboard and a pointing apparatus (e.g., a mouse or a trackball), through which the user can provide an input to the computer. Other kinds of apparatus can also provide an interaction with the user. For example, a feedback provided to the user may be any form of sensory feedback, e.g., a visual feedback, an auditory feedback, or a tactile feedback; and an input from the user may be received in any form, including an acoustic input, a voice input or a tactile input.

The system and the technology described here may be embodied in a computing system including a background component (e.g., used as a data server), or a computing system including a middleware component (e.g., an application server), or a computing system including a front-end component (e.g., a user computer with a graphical user interface or a web browser, through which the user can interact with an embodiment of the system and technology described here), or a computing system including any combination of such background component, middleware component and front-end component. The components of the system may be connected to each other through a digital data communication in any form or medium, e.g., a communication network. Examples of the communication network include a local area network (LAN), a wide area network (WAN), the Internet and a blockchain network.

A computer system may include a client and a server. The client and the server are generally remote from each other and usually interact through a communication network. The relationship between the client and the server is generated by computer programs running on corresponding computers and having a client-server relationship with each other.

According to the technical solutions in the embodiments of the present application, a target transaction request set participating in a block generation process is cumulatively determined through at least one cyclical selection according to a circle logic of selecting a current target factor interval and selecting a current target transaction request set from candidate transaction request sets corresponding to the current target factor interval, and finally blocks are generated by executing the transaction requests in the cumulatively determined target transaction request set, wherein there are dependency relationships between the transaction requests in the target transaction request set, which improves a rationality and a selection efficiency of a blockchain node in selecting the transaction requests in the block generation process, and improves a block output efficiency.

It should be understood that the steps may be reordered, added or deleted using various forms of flows as illustrated above. For example, the steps described in the present application may be performed concurrently, sequentially or in a different order, so long as the desired result of the technical solution disclosed in the present application can be achieved, which is not limited herein.

The specific embodiments do not limit the protection scope of the present application. It should be understood by those skilled in the art that various modifications, combinations, sub-combinations and replacements can be made according to design requirements and other factors. Any modification, equivalent replacement and improvement made under the spirit and principle of the present application should fall within the protection scope of the present application.

What is claimed is:

1. A method for processing transaction requests in a blockchain, comprising:
   judging, by a blockchain node, whether an execution of each transaction request to be selected of transaction requests to be selected in a blockchain network depends on a processing result of at least one transaction request to be selected of the transaction requests to be selected except the corresponding transaction request to be selected;
   in a case where the execution of the corresponding transaction request to be selected depends on the processing result of the at least one transaction request to be selected, determining, by the blockchain node, that the corresponding transaction request to be selected and the at least one transaction request to be selected has a dependency relationship, so as to obtain dependency relationships between the transaction requests to be selected;
   constructing, by the blockchain node, a directed acyclic graph between the transaction requests to be selected according to the dependency relationships between the transaction requests to be selected;
   aggregating, by the blockchain node, the transaction requests to be selected with dependency relationships by using the directed acyclic graph, to obtain transaction request sets;
   determining, by the blockchain node, a quotient value between a sum of payment vouchers of transaction requests to be selected in each transaction request set of the transaction request sets and a space occupancy of the corresponding transaction request set as an incentive factor of the corresponding transaction request set, wherein the space occupancy of the corresponding transaction request set is a sum of space occupancies of transaction requests to be selected in the corresponding transaction request set;
   determining, by the blockchain node, a candidate factor interval to which each transaction request set of the transaction request sets belongs by traversing upper limits and lower limits of candidate factor intervals, based on the incentive factor of the corresponding transaction request set, wherein the candidate factor intervals are pre-created, each candidate factor interval comprises an upper limit and a lower limit, upper limits of the candidate factor intervals do not overlap, and lower limits of the candidate factor intervals do not overlap;
   if the candidate factor interval to which the corresponding transaction request set is not determined, creating, by the blockchain node, a new candidate factor interval to which the corresponding transaction request set belongs;
   wherein the incentive factor of each transaction request set of the transaction request sets is used to represent a reward obtained by the blockchain node executing transaction requests to be selected in the corresponding transaction request set;
   wherein each candidate factor interval is used to evaluate a probability that a transaction request set in the corresponding candidate factor participates in a block generation process, and the larger the upper limit or the lower limit of the corresponding candidate factor interval, the larger the probability that the transaction request set in the corresponding candidate factor interval is selected to participate in the block generation process;

selecting, by the blockchain node, a candidate factor interval with a largest upper limit or a largest lower limit from the candidate factor intervals as a current factor interval;

selecting, by the blockchain node, a transaction request set with a largest space occupancy from transaction request sets corresponding to the current factor interval as a current transaction request set;

calculating, by the blockchain node, a total space occupancy of the current transaction request set and a target transaction request set selected in a current block generation cycle;

in a case where the total space occupancy does not exceed a block space threshold, using, by the blockchain node, the current factor interval as a current target factor interval and using, by the blockchain node, the current transaction request set as a current target transaction request set removing, by the blockchain node, transaction requests to be selected in the current target transaction request set from the transaction requests to be selected in the blockchain network, and returning to the step of constructing, by the blockchain node, a directed acyclic graph between the transaction requests to be selected according to the dependency relationships between the transaction requests to be selected;

in a case where the total space occupancy exceeds the block space threshold, determining, by the blockchain node, whether there is at least one transaction request set in the transaction request sets corresponding to the current factor interval, wherein a space occupancy of each transaction request set of the at least one transaction request set is less than a space occupancy of the current transaction request set in a case where there is the at least one transaction request set, determining, by the blockchain node, a transaction request set with a largest space occupancy from the at least one transaction request set as the current transaction request set, and returning to the step of calculating, by the blockchain node, the total space occupancy of the current transaction request set and the target transaction request set selected in the current block generation cycle; in a case where there is not the at least one transaction request set, selecting, by the blockchain node, a candidate factor interval with a largest upper limit or a largest lower limit from at least one candidate factor interval in which each candidate factor interval has an upper limit or a lower limit less than the current factor interval and each candidate factor interval is in the candidate factor intervals as the current factor interval, and returning to the step of selecting, by the blockchain node, the transaction request set with the largest space occupancy from transaction request sets corresponding to the current factor interval as the current transaction request set; and in a case where the total space occupancy reaches the block space threshold, generating, by the blockchain node, a block by executing all current target transaction request sets.

2. The method according to claim 1, wherein the selecting, by the blockchain node, the transaction request set with the largest space occupancy from the transaction request sets corresponding to the current factor interval as the current transaction request set, comprises:

among the transaction request sets corresponding to the current factor interval, sorting, by the blockchain node, space occupancies of the transaction request sets corresponding to the current factor interval in a descending order and selecting, by the blockchain node, a candidate transaction request ranked first as the current transaction request set.

3. A non-transitory computer readable storage medium storing computer instructions for enabling a computer to perform the method for processing transaction requests in a blockchain according to claim 2.

4. The method according to claim 1, wherein a consensus mechanism for block output competition is deployed in the blockchain network.

5. A non-transitory computer readable storage medium storing computer instructions for enabling a computer to perform the method for processing transaction requests in a blockchain according to claim 4.

6. A non-transitory computer readable storage medium storing computer instructions for enabling a computer to perform the method for processing transaction requests in a blockchain according to claim 1.

7. An apparatus for processing transaction requests in a blockchain, applied to a blockchain node, comprising:

a processor and a memory for storing one or more computer programs executable by the processor, wherein when executing at least one of the computer programs, the processor is configured to perform operations comprising:

judging whether an execution of each transaction request to be selected of transaction requests to be selected in a blockchain network depends on a processing result of at least one transaction request to be selected of the transaction requests to be selected except the corresponding transaction request to be selected;

in a case where the execution of the corresponding transaction request to be selected depends on the processing result of the at least one transaction request to be selected, determining that the corresponding transaction request to be selected and the at least one transaction request to be selected has a dependency relationship, so as to obtain dependency relationships between the transaction requests to be selected;

constructing a directed acyclic graph between the transaction requests to be selected according to the dependency relationships between the transaction requests to be selected;

aggregating the transaction requests to be selected with dependency relationships by using the directed acyclic graph, to obtain transaction request sets;

determining a quotient value between a sum of payment vouchers of transaction requests to be selected in each transaction request set of the transaction request sets and a space occupancy of the corresponding transaction request set as an incentive factor of the corresponding transaction request set, wherein the space occupancy of the corresponding transaction request set is a sum of space occupancies of transaction requests to be selected in the corresponding transaction request set;

determining candidate factor interval to which each transaction request set of the transaction request sets belongs by traversing upper limits and lower limits of candidate factor intervals, based on the incentive factor of the corresponding transaction request set, wherein the candidate factor intervals are pre-created, each candidate factor interval comprises an upper limit and a lower limit, upper limits of the candidate factor intervals do not overlap, and lower limits of the candidate factor intervals do not overlap if the candidate factor interval to which the corresponding transaction request set is not determined, creating a new candidate factor interval to which the corresponding transaction request set belongs;

wherein the incentive factor of each transaction request set of the transaction request sets is used to represent a reward obtained by the blockchain node executing transaction requests to be selected in the corresponding transaction request set;

wherein each candidate factor interval is used to evaluate a probability that transaction request set in the corresponding candidate factor participates in a block generation process, and the larger the upper limit or the lower limit of the corresponding candidate factor interval, the larger the probability that the transaction request set in the corresponding candidate factor interval is selected to participate in the block generation process;

selecting a candidate factor interval with a largest upper limit or a largest lower limit from the candidate factor intervals as a current factor interval;

selecting a transaction request set with a largest space occupancy from transaction request sets corresponding to the current factor interval as a current transaction request set;

calculating a total space occupancy of the current transaction request set and a target transaction request set selected in a current block generation cycle;

in a case where the total space occupancy does not exceed a block space threshold, using the current factor interval as a current target factor interval and using the current transaction request set as a current target transaction request set removing transaction requests to be selected in the current target transaction request set from the transaction requests to be selected in the blockchain network, and returning to the step of constructing a directed acyclic graph between the transaction requests to be selected according to the dependency relationships between the transaction requests to be selected;

in a case where the total space occupancy exceeds the block space threshold, determining whether there is at least one transaction request set in the transaction request sets corresponding to the current factor interval, wherein a space occupancy of each transaction request set of the at least one transaction request set is less than a space occupancy of the current transaction request set in a case where there is the at least one transaction request set, determining a transaction request set with a largest space occupancy from the at least one transaction request set as the current transaction request set, and returning to the step of calculating the total space occupancy of the current transaction request set and the target transaction request set selected in the current block generation cycle; in a case where there is not the at least one transaction request set, selecting a candidate factor interval with a largest upper limit or a largest lower limit from at least one candidate factor interval in which each candidate factor interval has an upper limit or a lower limit less than the current factor interval and each candidate factor interval is in the candidate factor intervals as the current factor interval, and returning to the step of selecting the transaction request set with the largest space occupancy from transaction request sets corresponding to the current factor interval as the current transaction request set; and generating a block by executing all current target transaction request sets.

* * * * *